Patented Jan. 13, 1931

1,789,022

UNITED STATES PATENT OFFICE

KARL PHILIPP, OF YONKERS, NEW YORK, ASSIGNOR TO THE PYRIDIUM CORPORATION, OF NEW YORK, N. Y., A CORPORATION OF NEW YORK

METHOD OF MANUFACTURING ALPHA-ALPHA-DIAMINOPYRIDINE

No Drawing.    Application filed September 30, 1927. Serial No. 223,242.

This invention is an improvement in methods of manufacturing apha-alpha-diaminopyridine.

The usual method of manufacturing alpha-alpha-diaminopyridine, contemplates two distinct steps, the first being the obtaining of sodamide, and the second the reacting of the sodamide with pyridine.

Sodamide is produced by treating fused sodium metal with dry ammonia gas, usually by bubbling the gas through the fused metal at a temperature of about 350° C., until no unchanged metal is visible on the surface of the melt.

The sodamide consolidates on cooling into a hard mass, and from this state it must be transformed into a condition of loose molecular cohesion in order to react it with the pyridine. This condition is produced by fusion, or by mechanical pulverization, and because of the affinity of the sodamide for water, the pulverization must take place in a dry atmosphere.

After pulverization, the sodamide and pyridine are mixed in a medium which is chemically indifferent to sodamide ($NaNH_2$), pyridine, and alpha-alpha-diaminopyridine, and which from a physical point of view possesses the requirements as a medium for the reaction. Oil media, such as Russian oil, dimethylaniline and diethylaniline have been used. Naphthalene and potassium cyanide are also suitable for the purpose.

All of these media are objectionable, however, in that they form an impurity after the cessation of the amido forming, and after the alpha-alpha-diaminopyridine is isolated. This impurity must be eliminated, which resulted in the slowing up of the process, and increase in the cost of the product.

In the usual process, the dry pyridine is added to the sodamide pulverized or emulsified with the medium, (diethylaniline mineral oil, or the like). Hydrogen is freed in the reaction, and the sodium compound of alpha-alpha-diaminopyridine is formed, which is afterwards transformed into the free diamino product and sodium hydroxide, by the careful addition of water. Or carbonic acid may be used (in which case sodium carbonate and freed diamino-pyridine are formed. The production results, however, are mediocre, since any impurity greatly reduces the yield. When water is used the caustic soda produced oxidizes a part of the amino pyridine, and this is lost as an impurity.

Investigation disclosed that the production of alpha-alpha-diaminopyridine increased in accordance with diminution of the reaction medium, when the reaction was carried on at a relatively high temperature. The increase of the desired product advanced with diminution of the reaction medium from about 40–50% to 70–80% of the theoretical amount, with a product of much greater purity.

By increasing the temperature of the sodamide at the beginning of the reaction, I am able to entirely eliminate the reaction medium, which is the cause of the impurities, and to very greatly increase the yield, of a relatively pure product, thus eliminating the necessity for the troublesome pulverization or emulsification of the sodamide.

One of the primary objects of the present invention is the provision of a method whereby a substantially pure product may be obtained.

Another object is the provision of a method enabling the direct coupling of the pyridine with the sodamide, without the interposition of a neutral medium, thus to provide a product with no admixture of substances other than those directly resulting from the reaction.

In carrying out the process, a retort is provided, equipped with a stirring apparatus, and means enabling a continuous flow of dry ammonia gas to the bottom of the retort. The retort should also be of a nature such that a pressure of from 4 to 5 atmospheres may be maintained therein.

A suitable quantity of metallic sodium is placed in the retort, and brought gradually to a temperature of about 400° C., under a pressure of about 4 to 5 atmospheres, and with vigorous agitation. The dry ammonia gas is conducted through the melt during the raising of the temperature, and in from 4 to 5 hours all of the metal is converted into sodamide.

The sodamide is then cooled to a temperature somewhat above its melting point, that is about 220° C., and dry pyridine is added very slowly and carefully with continuous stirring or agitation. While hydrogen is being freed in the reaction, a considerable agitation results, and after some time the product in the retort will form a solid mass which can no longer be stirred or agitated. The temperature is held at about from 200° to 210° C., as long as any hydrogen escapes, and the process is completed in about 12 to 15 hours.

The product is the disodium compound of alpha-alpha-diaminopyridine, and this is transformed into free alpha-alpha-diaminopyridine, and NaOH or $Na_2CO_3$ by the slow introduction of cold water or carbonic acid gas as the case may be, it being understood that either may be used. The raw mass is then dissolved in sufficient hot water, and filtered. While stirring and cooling, the alpha-alpha-diaminopyridine is separated with sodium hydroxide and sodium chloride. Further purification can be obtained if desired by recrystallizing from benzene, toluene or xylene.

The improved process greatly simplifies the manufacture of alpha-alpha-diaminopyridine in that the reaction between the pyridine and the melted sodamide is direct, and prior pulverization or emulsification of the sodamide with a reaction medium is eliminated. No supplemental purification of the diamino product is required, as would be the case were a neutral reaction medium used, since with the use of such media they must be removed from the product. No special construction of apparatus is necessary, and the production costs of the alpha-alpha-diaminopyridine are considerably reduced.

What is claimed as new is:—

1. The method of obtaining alpha-alpha-diaminopyridine, which consists in the direct addition of pyridine to sodamide while the sodamide is in a state of fusion.

2. The method of obtaining alpha-alpha-diaminopyridine, which consists in the direct addition of pyridine to sodamide while the sodamide is in a state of fusion at a temperature of about 220° C.

3. The method of obtaining alpha-alpha-diaminopyridine, which consists in the direct addition of pyridine to sodamide while the sodamide is in a state of fusion, and converting the product into free alpha-alpha-diaminopyridine and a sodium salt.

Signed at New York city, in the county of New York and State of New York this 29th day of Sept., A. D. 1927.

KARL PHILIPP.